(12) United States Patent
Baggs

(10) Patent No.: US 7,776,443 B1
(45) Date of Patent: Aug. 17, 2010

(54) SOYOIL PAINTBALL

(75) Inventor: Yancy Baggs, Neosho, MO (US)

(73) Assignee: Brass Eagle, LLC, Bentonville, AR (US)

( * ) Notice: Subject to any disclaimer, the term of this patent is extended or adjusted under 35 U.S.C. 154(b) by 1004 days.

(21) Appl. No.: 11/501,467

(22) Filed: Aug. 9, 2006

Related U.S. Application Data

(60) Provisional application No. 60/707,295, filed on Aug. 10, 2005.

(51) Int. Cl.
*B32B 5/00* (2006.01)
(52) U.S. Cl. .............................. 428/402.2; 8/501; 8/636
(58) Field of Classification Search .............. 428/402.2; 8/501, 636
See application file for complete search history.

(56) References Cited

U.S. PATENT DOCUMENTS 5,589,177 A * 12/1996 Herb et al. .................. 424/401
6,530,962 B1 3/2003 Stolz .............................. 8/576

* cited by examiner

*Primary Examiner*—Thao T. Tran
(74) *Attorney, Agent, or Firm*—Keisling & Pieper PLC; Trent C. Keisling; David B. Pieper

(57) ABSTRACT

The invention herein provides for an improved dye composition for encapsulation in casing structures adapted for projectile motion and rupture upon contact with a target surface, such as paint balls. The dye composition adapted for use in an impact-rupturable capsule of the invention comprises a water soluble dye and a lipophilic carrier having an oil and a nonionic surfactant, said surfactant comprising greater than 97% Poly[oxy-1,2-ethanediyl], alpha-[4-nonylphenyl]-omega-hydroxy-, branched and less than 3% polyethylene glycol and less than 2% dinonylphenyl polyoxyethylene by weight. The invention further provides for an impact-rupturable capsule containing the dye composition.

20 Claims, 1 Drawing Sheet

SOYOIL PAINTBALL

CROSS-REFERENCE TO RELATED APPLICATIONS

This application claims priority to and is a continuation-in-part of U.S. provisional application Ser. No. 60/707,295 filed on Aug. 10, 2005, entitled SOYOIL PAINTBALL.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

FIELD OF THE INVENTION

The invention relates to dye formulations for containment in impact-rupturable projectile capsules and for dispersing on impact with a surface. In particular, the invention pertains to dye compositions used in paint balls and in conjunction with paint ball firing devices in the sports and leisure fields, for example. Known art may be found in U.S. Class 8, subclasses 576 and others.

BACKGROUND OF THE INVENTION

Soft and hard capsules or casings have been employed in the pharmaceutical field to encapsulate a variety of therapeutic and nutritional liquid compositions. Similar technology has been employed in the sports and leisure fields to contain dye formulations within capsules adapted to rupture upon impact with an intended target. Liquid dye compositions encapsulated within gelatin casings, collectively and commonly known as "paint balls," are designed for use in conjunction with a projectile device, such as a "paint ball gun". Generally, such dye capsules have the physical properties in which the casing is hard and impact resistant enough to survive high velocity projectile forces, while at the same time adapted to rupture and release the dye composition upon high velocity contact with the target surface. "Paintball" is now a recognized and popular sporting activity, played by thousands of men and women throughout this country, as well as thirty other countries worldwide.

When employed in competitive activities wherein the objective of said activity is to identify the accuracy of marking the intended target, it is desirable to optimize the visual results of a successful contact with the intended target. Dye compositions used in paint balls are available in a wide variety of bright colors. The particular color can be used, for example, to identify the source of the paint ball after firing. In addition to a clearly visible coloration applied to the surface of the target, the effects can also be enhanced by the dispersing or "splatter" capabilities of the dye composition upon rupturing of the casing. These visual objectives must, however, be balanced in conjunction with certain physical parameters, such as cleaning from fabrics, overall weight and the ability for the liquid dye composition to be contained for a prolonged period of time within the casing material without substantive degradation. Furthermore, regulatory concerns must be addressed as well, such as toxicity of ingredients.

Some currently available dye compositions used in paint balls contain a dye in conjunction with hydrophilic carriers containing a mixture of high and low molecular weight polyethylene glycols (PEG). Among the disadvantages associated with currently available dye compositions include tenacious or permanent staining of target fabrics, freezing and solidification of the dye composition during exposure to colder temperatures, and separation and precipitation of dye composition ingredients during storage, and a thin consistency.

At least one attempt at a chemically altered paintball has been made. U.S. Pat. No. 6,530,962 to Stoltz shows a dye composition having an emulsifier and a lipophilic carrier for a paintball. The emulsifier necessarily includes ethoxylated mono- and diglycerides that thicken and concentrate the splatter from a ruptured paintball as shown in the Figures of that patent. While such may be acceptable to accomplish the object of that patent, such deviations from traditional paintball performance are not readily accepted by established players and hence undesirable.

There exists a need in the field of sports and leisure, as well as the zoological field, for improved technology relating to impact-rupturable capsules containing dye formulations that enhance the paintball while maintaining characteristic performance attributes. In particular, there is a need to improve the desirable attributes of impact-rupturable dye capsules by enhancing the properties of the dye formulations within while simultaneously maintaining the expected performance characteristics of the capsule.

SUMMARY OF THE INVENTION

The invention provides for an improved liquid dye composition for encapsulation in casing structures adapted for intact projectile motion and rupture upon contact with a target surface. In particular, the dye composition of the invention is useful in paint balls for use in conjunction with projectile devices, such as paint ball guns that maintain the expected performance characteristics of the paint balls. The dye composition of the invention is also useful in the zoological and wildlife preservation fields, such as "tagging" animals without substantive injury or the need for sedation in order to aid in tracking their movements through the environment.

It has been discovered that the use of certain types of surfactants in conjunction with certain other specific types of ingredients produce a liquid dye composition having a unique combination of desirable properties associated with the impact-rupturable capsules. More particularly, it has been discovered that dye formulations can be prepared which have the advantages of: i) improved consistency and reduced separation of ingredients; ii) comparable viscosity and thickness; iii) comparable "smearability" and splattering of dye on the target surface upon impact and rupture of the casing; iv) greater water solubility and improved machine washability; and v) greater ability to regulate weight of the capsule (up to 3.5 g limit).

The invention provides for a liquid dye composition adapted for use in an impact-rupturable capsule comprising a water-soluble dye and a lipophilic carrier having an oil and a nonionic surfactant, the surfactant comprising a liquid mixture that has greater than 97% Poly[oxy-1,2-ethanediyl], alpha-[4-nonylphenyl]-omega-hydroxy-, branched and less than 3% polyethylene glycol and less than 2% dinonylphenyl polyoxyethylene by weight.

The invention further provides for an impact-rupturable capsule comprising:

A casing adapted to contain a liquid dye composition, to remain intact upon exertion of projectile forces sufficient to propel said casing, and to rupture upon impact with a solid or semi-solid surface and release said liquid composition; and A liquid dye composition comprising a water-soluble dye and a lipophilic carrier having an oil and a nonionic surfactant, said surfactant comprising a liquid mixture that has greater than 97% Poly[oxy-1,2-ethanediyl], alpha-[4-nonylphenyl]-omega-hydroxy-, branched and less than 3% polyethylene glycol and less than 2% dinonylphenyl polyoxyethylene by weight.

An object of the present invention is to provide an improved formulation composition for a rupturable dye capsule.

Another object of the present invention is to provide a paint ball with an improved dye composition that maintains the expected performance characteristics of previous paint balls.

A basic object of the present invention is to provide an improved paint ball.

Yet another object of the present invention is to provide an improved dye formulation that may be easily substituted for other formulations in existing paint ball capsules.

An object of the present invention is to provide economical paint balls to enhance the sport.

A related object is to provide a dye composition that may be easily used with paint balls.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
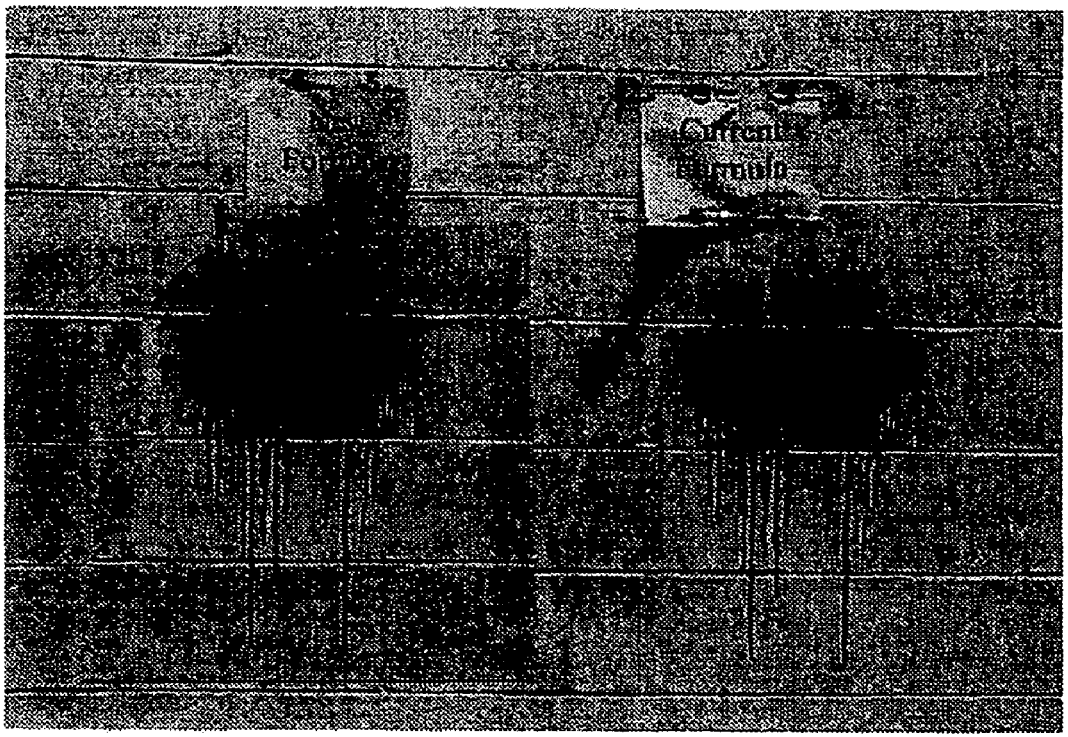
FIG. 1 is a photograph showing a comparison between the marking characteristics of the dye composition according to one embodiment of the invention and an existing dye composition as applied to a target surface.

As used herein, the phrase "impact-rupturable capsule" is meant to describe a capsule containing a liquid or semi-solid component therein, said capsule adapted to rupture upon impact with a solid or semi-solid surface.

As used herein, the term "paint ball" is meant to describe the commonly known combination of a liquid dye composition encased within a capsular structure and which is adapted for projectile motion. Although the term "ball" conventionally implies a spherical shape, the term as applied to the encapsulated dye composition described herein is not intended to be limiting to a spherical shape within the context of this invention.

The term "paint ball gun" and "paint ball marker" are meant to synonymously refer to the devices typically associated with the firing of paint balls.

The term "target is meant to refer to the solid or semi-solid object upon which the application of the dye composition is intended. Such objects can be living, such as human or other animals or non-living, such as inanimate or moving surfaces and structures. The terms "solid" and "semi-solid" when used in reference to a target surface are meant to describe the physical property of a surface which provides an opposing force sufficient to resist penetration by the impact-rupturable capsule when propelled onto the surface.

The term "liquid" when used to describe the dye composition of the invention, is meant to include any non-solid physical state of the composition capable of dispersing or spreading onto a given surface, i.e., in both its highly flowable state as well as semi-solid viscous and "smearable" state.

The dye composition of the invention is a mixture containing a water-soluble dye in a lipophilic carrier. More specifically, the liquid dye composition of the invention is a mixture comprising a water-soluble dye, a carrier oil, and a nonionic surfactant comprising a liquid mixture that has greater than 97% Poly[oxy-1,2-ethanediyl], alpha-[4-nonylphenyl]-omega-hydroxy-, branched and less than 0.3% polyethylene glycol and less than 2% dinonylphenyl polyoxyethylene by weight (available from the Univar Company). Additional ingredients which can be used include, but are not limited to, thickeners, opacifiers, and density agents.

Aqueous or water-soluble dyes which can be used in the invention include, but are not limited to, FD&C Yellow #5 (available from B F Goodrich Hilton Davis Chemical Company, Brecksville, Ohio), FD&C Yellow #6 (available from B F Goodrich Hilton Davis Chemical Company) D&C Yellow #10 (available from Warner Jenkinson, St. Louis, Mo.), FD&C Blue #1 (available from B F Goodrich Hilton Davis Chemical Company), D&C Red #28 (available from Warner Jenkinson), D&C Red #33 (available from Warner Jenkinson), Magenta Dispersion (available from Warner Jenkinson), Green Dispersion (available from Colorcon, West Point, Pa.), and Yellow Dispersion (available from Colorcon).

The aqueous waster-soluble dye can be present in an amount sufficient to afford the composition with apparent coloration. The dye can be present in an amount ranging from about 1% to about 10% by weight of the total composition. Preferably, the dye is present in an amount of about 5% by weight of the total composition.

A variety of colors can be used as the dye ingredient of the inventive composition. The liquid dye composition can be colored red, magenta, pink, yellow, blue, orange, purple, violet, green, and the like. Typically, highly visible colors are used, including fluorescent versions of the colors.

Oils used in accordance with the invention can include vegetable oils. Suitable vegetable oils include, but are not limited to, soybean oil, sunflower oil, corn oil, safflower oil, and the like. In a preferred embodiment, soybean oil is used.

The oil can be present in an amount ranging from about 20% to about 75% by weight of the total composition. Typically, the oil is present in an amount ranging from about 28% to about 30% by weight of the total composition. Preferably, the oil is present in an amount of about 29% by weight of the total composition.

Surfactants comprising nonionic liquids which can be used include those comprising mixtures Poly[oxy-1,2-ethanediyl], alpha-[4-nonylphenyl]-omega-hydroxy-, branched and polyethylene glycol and dinonylphenyl polyoxyethylene. One example of a commercially available surfactant is Vanwet 9N4, which comprises a blend of these chemicals (commercially available from the Univar company).

The nonionic surfactant can be present in an amount sufficient to provide a stable mixture in accordance with expected storage and usage temperatures. Preferably, the surfactant can be present in the dye composition in an amount ranging from about 0.1% to about 0.5% by weight of the composition, preferably in a range of from about 0.25% to about 0.35% by weight of the composition. More preferably, the surfactant is present in an amount of about 12.5% by weight of the total composition. The nonionic surfactant disperses the chemical constituents uniformly throughout the mixture.

Thickeners can be added to the composition to modify the texture and viscosity of the composition, and at least one thickener is preferred in the composition. Suitable thickeners include, but are not limited to, wax thickeners and silica thickeners. Suitable wax thickeners include beeswax and paraffin wax (available from Strahl & Putsch, Inc., West Babylon, N.Y.). Wax thickeners can be present in an amount up to 10% by weight of the total composition, more typically up to about 5% by weight. Preferably, the wax thickener is present in an amount of about 0.65% by weight of the total composition.

Suitable silica thickeners include, but are not limited to, $SiO_2$ compositions. Suitable $SiO_2$ compositions include Cabosil™ (commercially available from Cabot Corporation, Edison, N.J.) and HDKN-20 (commercially available from Wacher, King of Prussia, Pa.). Silica thickeners can be present in an amount of up to 3% by weight of the total composition, typically from about 0.25% to about 2.0% by weight of the total composition. Preferably, the silica thickener is present in an amount of less than 1.0% by weight of the total composition.

In a preferred embodiment, beeswax is used as a thickener in the composition. When the thickener combination is used, the thickeners are present in combination in an amount of 13% by weight or less of the total composition. Generally, the relative amounts and proportions of the thickeners will vary according to the viscosity properties desired.

To increase the density of the inventive composition to a level suitable for use in a firing device, density agents can be added. One example of a density agent is calcium carbonate. Other density agents which can be used include, but are not limited to, tricalcium phosphate, dicalcium phosphate, zinc gluconate, zinc sulfate, zinc oxide, and zinc citrate. Mixtures of density agents can be used as well.

The density agent can be present in an amount sufficient to assist in the rupture of the filled capsule upon impact with a target surface. Typically, the density agent can be present in an amount up to about 50% by weight of the total composition, more typically in an amount ranging from about 1% by weight to about 35% by weight of the total composition. Preferably, the density agent is present in an amount of about 25% by weight of the total composition.

Additional ingredients can be used in accordance with the invention, provided the inventive attributes of the composition are maintained. Secondary ingredients, such as opacifiers and the like, can be added to the composition.

The dye composition of the invention can be prepared by the following general process. An initial mixture can be prepared by adding a thickener, such as beeswax to a vegetable oil, such as soybean oil. This initial mixture is set aside to be used later in the process. An additional amount of the vegetable oil (e.g., soybean oil) is heated while stirring, followed by the slow addition of the surfactant and additional thickener (e.g., beeswax) to the oil. The resulting mixture containing the oil, surfactant and wax is then mixed until the ingredients are completely dissolved at a temperature of about 145.degree. F. While continually stirring, the initial mixture containing the oil and calcium carbonate is combined with the oil, surfactant and wax, and the entire composition is stirred until a uniform consistency is produced. The temperature is allowed to reduce. Once the temperature reduces to about 80.degree. F. or less, the color dispersion is added and the composition is mixed until uniform and for a time period of at least about 30 minutes. The resulting composition is in a flowable state immediately after the process. After setting over time, the composition sets into a semi-solid state with no observable separation.

Using this process, the following batch of liquid dye composition was prepared by adding the following ingredients and respective amounts as set forth below:

| Formula 1: Dye Composition containing surfactant | | |
| --- | --- | --- |
| Component | Weight (kg) | Weight % |
| Gel solution | 8.717 | 11.52% |
| Glycerin | 0.851 | 1.12% |
| Water | 3.798 | 5.02% |
| Gelatin nf200 | 4.296 | 5.68% |
| Fill - oil base light yllw | 24.44 | 32.30% |
| Yellow gr | 0.012 | 0.02% |
| Calcium carbonate | 2.077 | 2.75% |
| Beeswax | 0.489 | 0.65% |
| Surfactant | 0.244 | 0.32% |
| Soybean oil | 21.629 | 28.59% |
| Shell blue oil base | 8.717 | 11.52% |
| Blue dye #1 | 0.022 | 0.03% |
| White pearlscent | 0.109 | 0.14% |
| Glycerin | 0.262 | 0.35% |
| | 75.66 | 100.00% |

The casing material used in the impact-rupturable capsule of the invention can be any conventional material which can be formed into a capsule and adapted to encapsulate liquid contents while permitting rupture of the casing upon exertion of physical force thereon. Preferably, the casing material has chemical properties compatible with the composition contained thereby and physical properties sufficient to resist exertion of a projectile force while insufficient to resist impact forces following high airborne velocities. Even more preferred are casing materials which can be formed into an elastic ribbons or sheets to be filled with liquid and are suitable for heat or solvent sealing consistent with conventional die roll encapsulation manufacturing techniques. Additional suitable casing materials include, but are not limited to, gelatin, PVC, celluloses, modified starches, carrageenans, gums, pectins, alginates, and the like. Those skilled in the encapsulation arts will readily be able to select the appropriate casing material based upon the composition of the fill and the equipment used to perform the encapsulation. Generally, the casing material used for the capsule is any material usually used for the shell of a soft capsules. An example of a useful casing material is one consisting primarily if gelatin and further containing a plasticizer, pigment, solubility adjusting agent, and the like.

The overall shape of the capsule and casing can vary. Preferably, the shape of the capsule permits substantially linear movement through air when fired by a paint ball gun. Most preferably, the shape of the capsule is spherical. The diameter of the capsule can vary but is preferably compatible with the firing device with which it is to be used. For example, a 0.68 caliber spherical capsule can be used with commercially available paint ball guns.

The exterior appearance of the casing material and capsule can vary as well. A variety of visual designs and exterior coloration alternatives are possible. As with the dye formulation, a wide variety of colors can be used for the casing material either integrally or on the exterior surface alone. Lines, stripes, spots, marbled, two-tone designs can be used, for example. Various patterns can be applied to the surface of the capsules using the technique described in Brox et al., U.S. Pat. No. 5,529,767, the entire text of which is incorporated herein by reference.

The impact-rupturable capsules of the invention can be prepared using conventional techniques and apparatuses. Generally, with some modifications, the apparatuses used to prepare soft gelatin capsules in the pharmaceutical field can be used to manufacture impact-rupturable capsules. One example of a suitable apparatus is described in Stroud et al. U.S. Pat. No. 5,735,105, the entire text of which is incorporated herein by reference. This patent describes an apparatus and method for preparing liquid-filled capsules using a die roll apparatus through which a casing material in the form of a ribbon or sheet is fed.

The impact-rupturable capsules containing the dye composition of the invention are set into projectile motion with the casing substantially intact at a velocity sufficient to create the force permitting rupture of the casing and release of the liquid dye composition therein upon physical impact with the target surface. Typically, the suitable velocity range is from about 200 ft/sec to about 400 ft/sec, preferably within a range from about 300 ft/sec to about 350 ft/sec. Such devices are typically in the form of a gun assembly adapted for use with the capsules. The gun assembly is commonly referred to as a paint ball gun or "marker." Suitable paint ball guns include commercially available models such as those from Brass Eagle (Bentonville, Ark.). Accordingly in use, the impact-rupturable capsule is removed from a container and loaded into the paint ball gun. The gun is aimed at the intended target and fired, ejecting the impact-rupturable capsule substantially intact at high speed toward the target through the use of pressurized $CO_2$ or $N_2$. Upon impact on the target surface, the casing ruptures thereby releasing the liquid contents within onto the surface. The appearance of the liquid contents on the surface material is readily apparent by the observer.

EXAMPLE

Two liquid dye formulations were obtained and compared for appearance and washability. The dye formulations were identified as the currently available "old" formulation, and the "new" formulation in accordance with the invention. The respective formulations are set forth below:

| Old Formulation: | |
| --- | --- |
| Ingredient: | Amount (% w/w): |
| PEG 300 (hydrophilic carrier) | 85.02 |
| Glycerin | 2.99 |
| Rheolate ™ 5000 (thickener) | 3.30 |
| Ethomeen ™ (pH adjuster) | 0.70 |
| Water | 2.99 |
| Color | 5.00 |
| Total | 100.00 |

| New Formulation: | | |
| --- | --- | --- |
| Component | Weight (kg) | Weight % |
| Gel solution | 8.717 | 11.52% |
| Glycerin | 0.851 | 1.12% |
| Water | 3.798 | 5.02% |
| Gelatin nf200 | 4.296 | 5.68% |
| Fill-oil base light yllw | 24.44 | 32.30% |
| Yellow gr | 0.012 | 0.02% |
| Calcium carbonate | 2.077 | 2.75% |
| Beeswax | 0.489 | 0.65% |
| Surfactant | 0.244 | 0.32% |
| Soybean oil | 21.629 | 28.59% |
| Shell blue oil base | 8.717 | 11.52% |
| Blue dye #1 | 0.022 | 0.03% |
| White pearlscent | 0.109 | 0.14% |
| Glycerin | 0.262 | 0.35% |
| | 75.66 | 100.00% |

Referring now to the Figures, a visible comparison between the marking characteristics of the dye composition according to one embodiment of the invention and an existing dye composition as applied to a target surface can be seen in FIG. 1. The dye composition of the invention identified as the "new formula" corresponds to the invention.

The dye composition of the invention is useful in capsular structures designed for projectile motion and rupture upon impact with a target surface. Such uses include those associated with paint ball gaming activities, as well as other contexts of marking of objects. Typically, the impact-rupturable capsules of the invention are set into motion by a firing device, such as a paint ball gun.

The invention has been described with reference to various specific and preferred embodiments and techniques. It will be understood, however, that reasonable modifications of such embodiments and techniques can be made while remaining within the spirit and scope of the invention.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A liquid dye composition adapted for use in an impact-rupturable capsule comprising a water-soluble dye and a lipophilic carrier having an oil and nonionic surfactant, said surfactant comprising greater than 97% Poly[oxy-1,2-ethanediyl], alpha-[4-nonylphenyl]-omega-hydroxy-, branched and less than 3% polyethylene glycol and less than 2% dinonylphenyl polyoxyethylene by weight.

2. The liquid dye composition according to claim 1 wherein the impact-rupturable capsule is spherical in shape.

3. The liquid dye composition according to claim 1 wherein the oil is vegetable oil.

4. The liquid dye composition according to claim 3 wherein the oil is soybean oil.

5. The liquid dye composition according to claim 1 wherein the surfactant is present in an amount ranging from about 0.1% to about 0.4% by weight of the total composition.

6. The liquid dye composition according to claim 1 further comprising at least one thickener.

7. The liquid dye composition according to claim 6 wherein the thickener comprises wax.

8. The liquid dye composition according to claim 6 wherein the thickener is beeswax.

9. The liquid dye composition according to claim 1 further comprising a density agent.

10. The liquid dye composition according to claim 9 wherein the density agent is calcium carbonate, tricalcium phosphate, dicalcium phosphate, zinc gluconate, zinc sulfate, zinc oxide, and zinc citrate, or mixtures thereof.

11. A liquid dye composition adapted for use in an impact-rupturable capsule comprising a water-soluble dye and a lipophilic carrier, said lipophilic carrier comprising:
   a vegetable oil;
   a surfactant comprising greater than 97% Poly[oxy-1,2-ethanediyl], alpha-[4-nonylphenyl]-omega-hydroxy-, branched and less than 3% polyethylene glycol and less than 2% dinonylphenyl polyoxyethylene by weight; and,
   a thickener.

12. The liquid dye composition according to claim 11 wherein the impact-rupturable capsule is spherical in shape.

13. The liquid dye composition according to claim 11 wherein the oil is soybean oil.

14. The liquid dye composition according to claim 11 wherein the surfactant is present in an amount ranging from about 0.1% to about 0.4% by weight of the total composition.

15. The liquid dye composition according to claim 11 further comprising at least one thickener and said thickener is selected from the group including wax and beeswax.

16. The liquid dye composition according to claim 11 further comprising a density agent and said density agent is selected from the group including calcium carbonate, tricalcium phosphate, dicalcium phosphate, zinc gluconate, zinc sulfate, zinc oxide, and zinc citrate, and mixtures thereof.

17. An impact-rupturable capsule comprising:
   a casing containing a liquid dye composition, to remain intact upon exertion of projectile forces sufficient to propel said casing, and to rupture upon impact with a solid or semi-solid surface and release said liquid composition; and
   wherein said liquid dye composition comprises a water-soluble dye and a lipophilic carrier comprising soy-oil and a nonionic surfactant, said surfactant comprising greater than 97% Poly[oxy-1,2-ethanediyl], alpha[4-nonylphenyl]-omega-hydroxy-, branched and less than 3% polyethylene glycol and less than 2% dinonylphenyl polyoxyethylene by weight.

18. The liquid dye composition according to claim 17 wherein the surfactant is present in an amount ranging from about 0.1% to about 0.4% by weight of the total composition.

19. The liquid dye composition according to claim 18 further comprising at least one thickener and said thickener is selected from the group including wax and beeswax.

20. The liquid dye composition according to claim 19 further comprising a density agent and said density agent is selected from the group including calcium carbonate, tricalcium phosphate, dicalcium phosphate, zinc gluconate, zinc sulfate, zinc oxide, and zinc citrate, and mixtures thereof.

* * * * *